United States Patent Office

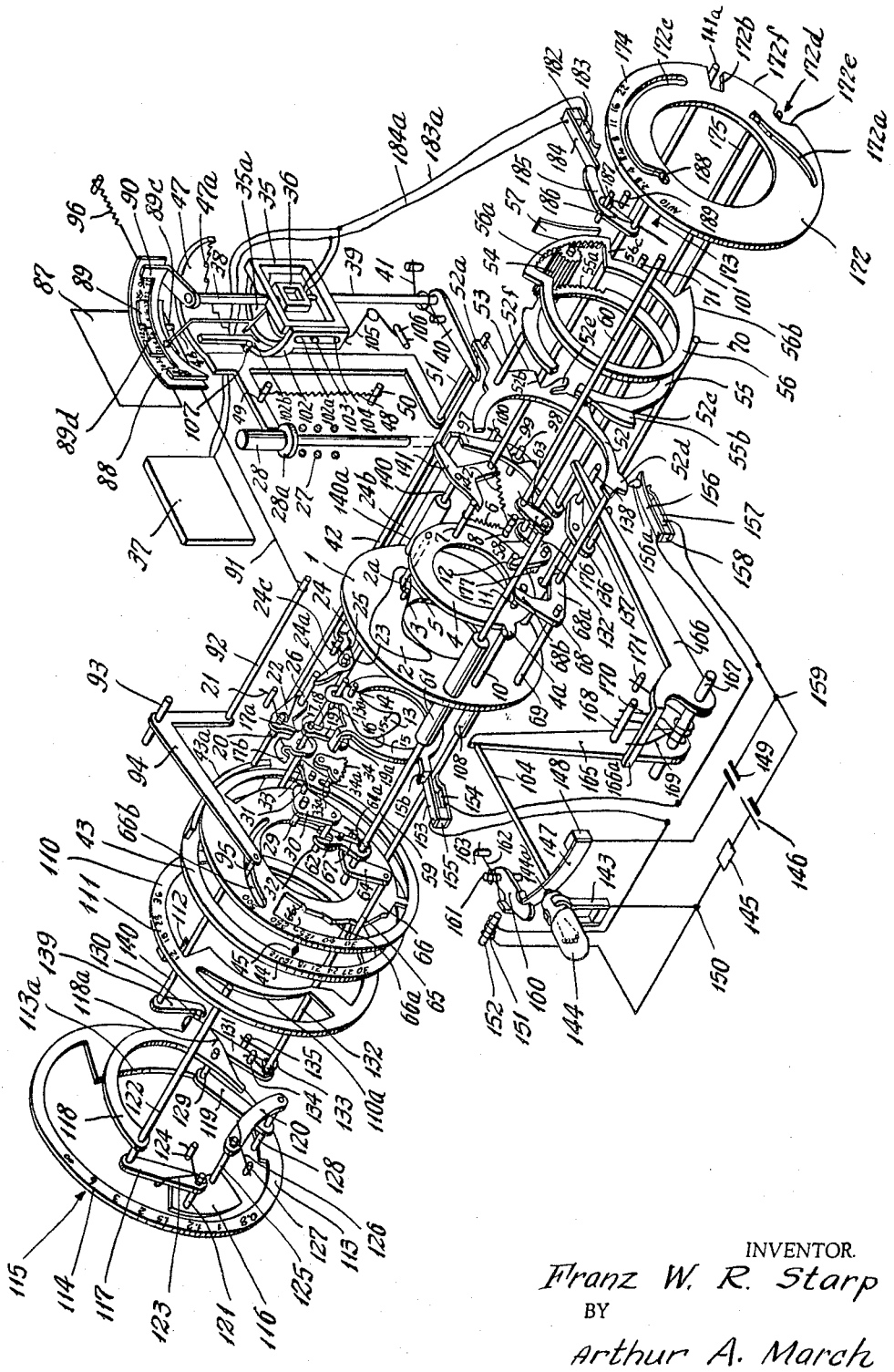

3,273,482
Patented Sept. 20, 1966

3,273,482
PHOTOGRAPHIC CAMERA WITH AUTOMATIC DIAPHRAGM SETTING IN THE FLASH RANGE
Franz W. R. Starp, Calmbach (Enz), Germany, assignor to Alfred Gauthier G.m.b.H., Calmbach (Enz), Germany, a corporation of Germany
Filed Feb. 4, 1964, Ser. No. 342,365
Claims priority, application Germany, Feb. 6, 1963, G 36,992
7 Claims. (Cl. 95—64)

This invention relates to a photographic camera having means to set the diaphragm aperture automatically for taking flash pictures after the flash bulb guide number and the distance, or range, values have been preset.

Cameras have been known heretofore which provide for automatic setting of the diaphragm when flash pictures are to be taken but such cameras have either used members of a sensing device that cooperates with the exposure meter, or they have used a special sensing device for flash exposures. Such arrangements have been quite complicated structurally and in operation and they have required comparatively large space for their installation.

The present invention has for one of its objects to provide a relatively simple structure for obtaining satisfactory setting of the diaphragm with a stop that may be set manually to correspond to the right distance and guide number, the device being also suitable for cameras having diaphragm setting members with a comparatively small adjustment path. In addition it is an object of the present invention to provide the foregoing arrangement in such form that the individual structural members of the device can be accommodated in the shutter housing while the basic structure of the shutter is retained.

In accordance with the present invention the foregoing objects are achieved by a structure which includes a five element jointed member which consists of one fixed and four movable connecting members arranged around the optical axis so that it can be influenced at two of its movable connecting members by cam sensing by the guide number setting member, or control, and the range setting member, or control, and which sets a stop by means of another movable connecting member. The position of the stop controls the diaphragm setting in the flash range by way of a lever system that cooperates with the stop and with the diaphragm and is influenced by a spring. With this relatively small additional number of elements, it has thus become possible to provide a device which insures dependably, automatic setting of the diaphragm in the flash range of the camera after the guide number and the distance value have been preset. Moreover, the five element jointed member has made it possible to accommodate the automatically operating diaphragm setting device without appreciable changes of the basic structure of the interior elements of the shutter by means of the fact that the individual structural elements are arranged annularly.

In order to produce the five element jointed member with a minimum of parts the invention further provides that the axis of the two joints of the five element member which are adjacent to the fixed joints are formed of sensing pins which cooperate with control cams of the guide number setting member and the range setting member. In addition a cam is formed on one of the connecting members in the range of the fifth hinged point, this cam being engaged by a sensing pin acting as a stop.

All of the three cams which control the position of the sensing pin acting as a stop, according to the invention, offer maximum flexibility and freedom of choice to the designer. More particularly it is possible to proceed from setting paths of the range and guide number setting member of any size desired and from arbitrarily shaped scales on these setting members and yet arrive at a functionally correct action on the diaphragm with the shortest setting path.

Another feature of the invention is directed at excluding the possibility of taking wrongly exposed flash photographs, even if the diaphragm setting device is not, in itself, the reason for the wrong exposure. For example, the photographer may have forgotten to insert a new flash bulb into the mount provided therefor. In such case the invention will avoid a wrongly exposed photograph because of the fact that a lever system is provided in which the diaphragm setting motion requires a motion of the camera release mechanism and an arresting lever is provided for the camera release mechanism, which lever cooperates with means in the form of a pair of levers that connect with the flash bulb socket to sense when a flash bulb has been placed therein. If there is a flash bulb in the socket, the arresting lever is in an inoperative position but if no flash bulb is in the socket, the camera release mechanism is locked so that no photograph can be taken.

In order to make the release locking device operative after each exposure, the invention provides a spring element, which is retained by a pawl and which presses the used flashbulb out of its socket. An electromagnet is provided in the ignition circuit of the flash bulb to attract the pawl and thereby to release the spring element.

Still another source of error in flash exposures may arise from the fact that the distance that has been set is either too great or too small for the light yield of the flash bulb being used. The automatic diaphragm setting device is dependent upon the diaphragm limits of the camera and is usable to adjust to requirements that exceed these limits. It is therefore proposed that the sensing pin acting as a stop be arranged on a lever and that this lever act upon a balance-beam lever fixed on the bearing shaft of the immediately preceding lever and provided with two pins, which, in turn, act on the pair of levers cooperating with the arresting lever so that the release locking lever is operative as long as the sensing pin and its lever are in those end positions which correspond to a diaphragm value that cannot be achieved with the camera being used.

Cameras that are generally similar to the camera of the present invention, in which the setting of the diaphragm in a daylight range is at least dependent on the indication of an exposure meter and on the setting of a film sensitivity sensing member, must also save the operator the effort of switching over upon changing from the daylight range to the flash range by means of automatic devices. In the present invention this result is obtained because there is, in the ignition circuit, a switch operated by a cam on an adjusting ring coupled to the sensing member of the exposure meter. This switch makes contact when the adjusting ring is in its inoperative position and an arresting slide is provided to insure the inoperative position of the adjusting ring when the exposure meter either produces no deflection at all or a deflection which is insufficient for daylight exposures. In order to make the diaphragm setting device for flash exposures inoperative when there is daylight or when the camera is set for manual operation, a T-shaped lever that acts as one component of the lever system cooperating with the diaphragm and stop is provided with a pin. In case of automatic daylight exposures, this pin engages a peripheral portion of the adjusting ring while, in the case of manually set exposures the pin engages a peripheral portion of a setting ring and thereby locks the lever system.

Details of the invention will become apparent from the following specification and from the accompanying drawing which illustrates one embodiment of the invention in connection with a camera equipped with controls for preselecting one exposure factor and with a device for automatically setting the other exposure factor as well as for correcting the preselected factor.

In the drawing a carrier plate 1 is mounted in a shutter housing (not shown) to support a plurality of diaphragm lamellae of which only one lamellae 2 is shown. The lamellae are mounted on fixed pins 3 and are actuated by a ring 4 which is able to rotate, at least to a limited extent, and which has a plurality of pins 5 that engage slots 2a in the lamellae. The ring 4 is pulled clockwise by a tension spring 6, one end of which engages a pin 7 on the ring and the other end of which is attached to a fixed pin 8. A projection 4a extends from the ring 4 and engages a pin 10 on the plate 1 to serve as a stop for fixing the starting position of the ring 4 with respect to the plate 1. This starting position is, in the embodiment shown, associated with the largest aperture position of the lamellae 2 which position may correspond to a diaphragm value of 2.8 for example. The ring 4 also has two pins 11 and 12 which are engaged by load transmission members, or linkages, of the diaphragm setting mechanism that operate independently of each other as will be described hereinafter. The lamellae 2 and the other elements connected thereto, as described above, comprise the means to set one of the exposure factors, in this case the diaphragm aperture size.

As in the case of the diaphragm lamellae 2, only one of the shutter blades 13 is shown for reasons of clarity and is mounted on a pin 14 extending from a ring 15. The latter is rotatably mounted in the shutter housing so as to be coaxial with the ring 4 and a pin 16 is rigidly attached to the carrier plate 1 to engage a slot 13a in each of the shutter blades 13. The ring 15 is rotated back and forth, in a manner which is well known, by driving means comprising a rotatably mounted cocking and driving disc 17 provided with a pin 18 on which a driving pawl 19 is pivotally mounted. The pawl 19 has jaws 19a which engage an arm 15a bent at right angles to the ring 15.

An arresting lever 22 pivotally mounted on a fixed pin 20 is pressed by a coil spring 21 against a projection 17a on the disc 17 to keep the latter in cocked position as shown in the drawing. A release lever 24 pivotally mounted on a journal 23 is pressed against a fixed pin 24c by a spring 25. One arm 24a of the release lever engages a pin 26 on the arresting lever 22 while the other arm 24b extends into a path of motion of a shutter release, or trigger, 28 which is pressed upwardly by a compression spring 27 and which may be located in the camera case (not shown).

After the driving disc 17 has been released by the arresting lever 22, the disc rotates by virtue of the pressure of the usual driving spring (not shown) in a counterclockwise direction which causes the pawl 19 to rotate the ring 15 so as to pivot the shutter blades first in one direction to open the shutter and then in the reverse direction to close it again.

An escapement mechanism is provided to obtain different exposure times and is arranged in the shutter housing in a manner which has been known heretofore. This escapement mechanism comprises a plate, or lever, 30 which is pivotally mounted on a fixed pin 29 and is provided with oppositely directed pins 31 and 32. An escapement braking lever 33 is pivotally mounted on the pin 31 to cooperate with the disc 17 and with a toothed segment gear 34 connected to the lever 33 by means of a pin 34a that engages a slot 33a in the lever. If desired, the gear segment 34 may be meshed with other gear members in a manner known heretofore so as to make possible a wide range of shutter speeds. The plate 30, the braking lever 33, the toothed gear segment 34 and the gear members cooperating with the latter may be located on a fixed bearing plate in accordance with similar structures known heretofore.

In order to obtain different exposure times, or different shutter speeds, the braking lever may be set at different positions with respect to the lug 17b of the disc 17. This causes the lug 17b to engage the braking lever 33 over a distance determined by the position to which the braking lever is set. The setting of the braking lever is effected by the lever 30, the pin 32 of which engages a linkage connecting it to a photoelectric exposure meter.

The exposure meter includes a frame 35 and a rotating coil 36 pivotally mounted therein. It also includes a photocell 37 electrically connected to the coil 35 to supply an electric current thereto corresponding in intensity to the intensity of light striking the photocell from the scene to the photographed. The frame has two end shafts 38 and 39 which are coaxial with the axis of the rotating coil 36 and which are pivotally mounted in fixed bearings. A lever 40 is rigidly attached to the shaft 39 and the free end of the lever 40 is pressed, by means of a spring 41, against a transmission pin 42 which is movable in a direction parallel to the optical axis of the shutter. The pin 42 bears against the face of a cam 43a on a film sensitivity setting member 43 which may be rotated about the optical axis of the shutter to take the film sensitivity into consideration. The sensitivity is indicated on a scale 44 which may be set with respect to a fixed mark 45.

Returning to the exposure meter, a needle 46 is affixed to the coil 36 to indicate the light intensity but, because the coil 36 may be preset by the lever 40 and the pin 42, the position of the needle 46 is modified by the setting of the film sensitivity control 43. Part of the mechanism connecting the exposure meter to other portions of the shutter is a sensing member 47 which is made in the form of a slide capable of being moved parallel to the direction of travel of the shutter release trigger 28. The sensing member has an arm that is held against a flange 28a on the trigger by means of a spring 48 so that the slide moves downwardly when the trigger is depressed to make a photographic exposure. The spring is stretched between the pin 49 on the sensing member 47 and a fixed pin 50. This spring is somewhat weaker than the spring 27 so that the latter controls the position of the shutter release except when the photographer overcomes it in order to make an exposure. The sensing member 47 has a stepped cam 47a, one of the steps of which comes to rest on the lower extension of the needle 46 when the shutter release 28 is depressed so as to leave the sensing member free to move downwardly under the force of the spring 48. To keep the needle 46 from absorbing all of the force of the spring 48, a supporting member in the form of an arch 35a is provided on the frame 35.

The sensing member 47 is operatively connected by means of a pin 51 with a rotatable setting ring 52 coaxial with the optical axis. The connection between the pin 51 and the ring 52 is a slot 52a on an arm extending from the ring. The setting ring has a pin 53 on which a pinion 54 is rotatably mounted. This pinion engages the external teeth 55a of a ring 55, which is also coaxial with the optical axis and which may be used to set the exposure time of the shutter by adjusting the shutter speed escapement mechanism, and the pinion also is meshed with the internal teeth 56a of another ring 56 which is also coaxial with the optical axis and cooperates with the ring 4 that positions the diaphragm lamellae 2. A brake, which may take the form of a leaf spring 57, engages the outer circumference of the ring 56 to increase the starting moment of rotation of that ring and make it less easy to turn initially than the ring 55. Thus when the setting ring 52 is rotated clockwise under pressure from the sensing member 47, the axle 53 of the pinion 54 is carried along in the same clockwise direction and, since the brake 57 makes the ring 56 initially resist movement, the pinion rotates on its axle and drives the ring 55 clockwise by means of the teeth 55a.

Of the two exposure factors, shutter speed and diaphragm aperture, the embodiment shown uses the ring 55 for controlling the shutter speed and the ring 56 for controlling the diaphragm setting. To accomplish this the ring 55 has a cam 55b which increases radially outwardly and which acts upon the aforementioned linkage, or load transmission mechanism, that sets the shutter speed escapement mechanism. This linkage consists, in the present embodiment, of a lever 58 which is rigidly attached to a shaft 59 that extends parallel to the optical axis of the shutter and carries a pin 60 which acts as a cam follower bearing against the cam 55b. The shaft 59 may be pivotally mounted in a sleeve 61 affixed to the carrier plate 1 and may carry at the end remote from the lever 58 a lever 62 with a forked end that embraces the pin 32 of the lever 30. The lever 62 is rigidly attached to the shaft 59. A spring 63 on the shaft exerts pressure between the fixed pin 8 and the pin 60 to urge the shaft 59 to rotate in the clockwise direction, thus tending to keep the linkage 58 and 60 and 62 and the shutter speed escapement mechanism connected thereto in the starting position associated with the longest exposure time, or slowest speed of the shutter. This may be, typically, 1/30 second. Sensing means including lever 64 is also rotatably mounted on the end of the shaft 59 beyond the lever 62 and is provided with a sensing pin 65 that serves as a cam follower for a cam 66a on the shutter speed setting control 66. In the embodiment shown, this control sets the manually preselectable exposure factor, which in this case is the shutter speed. The control 66 is set with respect to the fixed mark 45 by reference to a scale 66c of shutter speeds. The setting of the control 66 is transmitted to the shutter speed escapement mechanism by means of an arm 64a on the sensing lever 64. The arm 64a is engaged by a spring 67 which urges it into contact with the forked lever 62 so as to obtain a unilateral driving connection which is operative in the clockwise direction.

Like the ring 55, the ring 56 also carries a radially ascending cam 56b which influences the position of the diaphragm control ring 4. The transmission of control influence from the cam 56b to the ring 4 is effected by a linkage which includes a bellcrank lever 68 pivotally mounted on a pin 69 on the carrier plate 1. One arm 68a of the lever 68 has a pin 70 that serves as a cam follower riding upon the surface of the cam 56b while the other arm 68b presses against the pin 11 of the ring 4. Upon clockwise rotation of the ring 56, the diaphragm lamellae 2 are moved in toward positions of increasingly smaller diaphragm aperture. When the lamellae reach the position of smallest diaphragm aperture, an edge 56c of the ring 56 strikes a fixed pin 71 and stops any further clockwise rotation of the ring.

The camera is further provided with an indicating device which may be visible in the view finder 87 of the camera and comprises, in addition to the exposure meter needle 46, three main components. There are:

A fixed scale carrier 88 extending over the entire range of motion of the exposure meter needle 46, and an indicating flag 89, which cooperates with the scale carrier, and the setting position of which can be influenced by the control 66. Associated with these structural members is a mask 90 which can be controlled by means of the film sensitivity control 43. The fixed scale carrier 88 comprises three scale rows. The upper scale row is associated with the preselectable exposure factor, which, in the present embodiment, is the exposure time. The upper row therefrom shows numerical values which correspond to the scale 66c of the shutter speed control 66. The middle and the lower scale rows are subdivided into a left and a right scale group. The middle scale row of the left scale group is composed of numerical values which happen, in the present embodiment, to be equivalent to exposure times from 1/30 sec. to 1/250 sec., while the middle scale row of the right scale group shows the numerical values which are identical with exposure times from 1/60 sec. to 1.500 sec. In the lower scale row on the left, there appears several times the extremely high diaphragm value "2.8," while the extremely low diaphragm value "22" appears several times in the lower scale row on the right.

A catch 89c on the indicating flag or lug may serve for attaching a string or thread 91, the other end of which is secured to a pin 92 carried by a lever 94 pivotally mounted on a fixed pin 93. The bell crank lever 94, in turn, has a pin 95 that extends into a control slot 66b on the shutter speed control 66. A spring 96 is attached to the catch 89c to pull the indicating flag 89 into its right end position. The indicating flag 89 also has a window 89d through which the upper scale row of the fixed scale carrier 88 may be viewed. The exposure time value preselected by means of the shutter speed control 66 appears in this window. Moreover, the indicating flag 89 also carries a diaphragm scale which increases from left to right and which carries the diaphragm values from "2.8" to "22."

The mask 90 operatively connected to the film sensitivity control 43 is rigidly attached to the shaft end 38 for positioning the frame 35, and, thereby, the rotating coil 36. Both the mask 90 and the fixed scale carrier 88 carry at their left end a symbol which is intended to indicate that it is necessary to take photographs with artificial light, such as a flashgun for obtaining useful photographs, if the exposure meter needle 46 is located in this left marginal region.

In the setting position shown in the drawing the indicating flag 89 covers the upper scale of the preselectable exposure factor, except for the figure "125," which is visible in the window 89d. This means that the exposure time 1/125 sec. has been preselected on the shutter by means of a shutter speed control 66. As long as the exposure meter needle 46 stays within the range occupied by the indicating flag 89, it may be expected that both the preselected exposure time and the diaphragm value indicated on the indicating flag by the exposure meter needle 46 will actually be set. However, if the exposure meter needle 46 points to one of the time-diaphragm pairs which are contained in the middle and bottom rows of the fixed scale carrier, it means that the exposure time corresponding to the preselection and visible in the window 89d, is not being used but that a different exposure time is set according to the time/diaphragm pair indicated by the exposure meter.

An additional release locking device is provided to insure that no photograph can be taken with automatic setting of the exposure factors if light conditions are outside the operating range of the camera. In this connection it is to be noted that the release push rod 28 strikes the release lever 24 after the setting process has terminated and that the lever 24 operates through the arresting lever 22 to release the shutter for opening and closing. As may be noted in the drawing the release lever 24 is unable to move since its arm 24b rests on an arresting lever 97. The lever 97 is pivotally mounted on a pin 98 and is capable of absorbing the full pressure of the release pushrod 28. The arresting lever is kept in its arresting or locking position as shown in the drawing by means of a spring 99 one end of which engages a fixed pin 100 and the other end of which bears upon the arresting lever 97. However, a pin 101 extending from one end of the arresting lever cooperates with a cam 52c of the adjusting ring 52 so that as soon as the adjusting ring rotates clockwise by a small amount during the sensing process, the pin 101 is pushed away by the cam 52c thus pivoting the arresting lever counterclockwise about the pin 98 and moving the other end of the arresting lever 97 out of the path of the release lever 24. The cam 52c that moves the arresting lever 97 is so proportioned that, if the existing light conditions exceed the setting range of the camera, the pin 101 will reach a setting position on the ring 52 corresponding to the shutter speed of 1/500 second and a diaphragm size of "22" and will then slide off the far side of the cam 52c, thereby enabling the arresting lever 97 to return to its operative position.

In order to prevent operation of the shutter if the light conditions are too weak to effect an automatic exposure while the flash device (to be described below) is not ready for operation, a device is provided which causes the ring 52 to stop, during the sensing process, before its cam 52c reaches the pin 101. This device includes an arresting slide 102 which slides on the frame 35 of the exposure meter so as to be movable parallel to the direction of motion of the sensing member 47. The slide 102 has a slot 102a that fits over two guide pins 103 and 104 on the frame 35. One end of a spring 105 presses against the slide 102 while the other end of the spring presses against a fixed pin 106 to press the slide toward its inoperative position which is the same as shown in the drawing. In this position the slide is pressed against a pin 107 on the sensing member 47 by the force of the spring 105. If the light is too weak or if the photocell 37 is short-circuited, the exposure meter pointer 46 will be located beneath an edge 102b of the arresting slide 102. Then, if the shutter release pushrod 28 is depressed, the arresting slide 102 will be able to travel only a short distance before it is stopped by the pointer 46. The latter in turn is supported by the arcuate support member 35a. Because of the fact that the pin 107 rests on the arresting slide 102, the sensing member 47 is also brought to a standstill. This happens almost as soon as the sensing member begins to move so that the ring 52 is not rotated enough to permit the cam 52c to release the lever 97. Only when the light intensity is within a premissible range within which the exposure meter pointer 46 releases the edge 102b of the arresting slide, will the photographer be able to make a photograph when the camera is set for automatic exposures.

In addition to the foregoing members which are required for carrying out automatic exposures in daylight the invention provides additional members which make it possible to carry out a flash exposure, without prior switching, if the ambient illumination is insufficient. In this case the diaphragm is set automatically in response to the settings of the range, or distance, control as well as the guide number of the flash bulb used.

A guide number setting control 110 modifies the operation of the automatic setting device for the diaphragm. The control 110 is rotatably mounted to pivot about the shutter axis and is provided with a cam 110a and a scale 111 of flash bulb numbers, the setting of this scale being indicated by reference to a fixed mark 112. The range is set by means of a range, or distance, control 113 which has a cam 113a and a range scale 114 that is set with relation to a fixed mark 115.

A device having five members together with an associated lever detects the setting values for the guide number of the flash bulb and the exposure range and transforms these two factors into a diaphragm-setting motion. This five-membered device comprises a fixed plate 116, a sensing lever 117, a sickle-shaped lever 118, a connecting rod 119, and a sensing lever 120. The lever 117 is pivotally mounted on a pin 121 on the plate 116 and is provided with a sensing pin 122 that cooperates with the guide number cam 110a. One end of a coil spring 123 that is wound around the pin 121 engages the lever 117 while the other end of the spring engages a fixed pin 124 so as to urge the lever 117 in the clockwise direction thereby causing the sensing pin 122 to press against the control cam 110a and act as a cam follower. Similarly the lever 120 is pivotally mounted on a pin 125 and one end of a spring 126 presses against the lever 120 while the other end of the spring engages a fixed pin 127 thereby tending to rotate the lever 120 clockwise so that a sensing pin 128 on this lever presses against the range cam 113a. The two pins 122 and 128 also act as articulated pins, for the sickle-shaped lever 118 is pivotally mounted on the pin 122, and the connecting rod 119 is pivotally mounted on the pin 128. Another pin 129 forms an articulated joint between the lever 118 and the connecting rod 119. The sickle-shaped, or crescent-shaped, lever 118 has a cam 118a adjacent to the pin 129. A cam follower in the form of a sensing pin 130 presses against the cam 118a and is mounted on a lever 131 which is rigidly connected to a shaft 132 mounted in a bearing bushing, or sleeve, 108 on the fixed carrier plate 1. One end of a spring 133 engages the pin 134 on the lever 131 while the other end of the spring engages a fixed pin 135 to provide a force which keeps the sensing pin 130 in contact with the cam 118a. A scale beam lever 136 having pins 137 and 138 is mounted at the opposite end of the shaft 132 from the end on which the lever 131 is mounted.

The sensing pin 130 is designed not only for use in setting the lever 131 but also as a stop for a lever 139 which is attached to one end of a shaft 140. The latter shaft is pivotally mounted in a bearing sleeve 140a on the plate 1 and has a T-shaped lever 141 at its other end connected rigidly to the shaft. A pin 141a is mounted on the middle arm of the lever 141 and a spring 142, one end of which is attached to the fixed pin 8, presses on the pin 141a to rotate the lever 141 clockwise. As a result the right arm of the lever 141 comes to rest on the top of the arm 24b of the release lever 24 while the left arm of the T-shaped lever is located in the range of motion of the pin 7 of the diaphragm lamellae ring 4. The tension of the spring 142 is so regulated that the lever 141 is unable to pivot the release lever 24 against the action of its spring 25, and only when the shutter release pushrod 28 is depressed will the release lever 24 be rotated clockwise, during which motion the lever 141 is also able to rotate clockwise under the force of the spring 142. In doing so it drives the ring 4 in a counterclockwise direction against the action of the weaker spring 6. Simultaneously the lever 139 rotates until it impinges on the sensing pin 130. This terminates the setting of the diaphragm and, upon further depression of the shutter release 28, the driving disc 17 of the shutter is released to run down.

A setting of the diaphragm aperture in the manner described above presupposes that when the shutter release 28 is depressed, the ring 52 will either not be able to rotate at all or at most will rotate only slightly so that the pin 141a is free to move beneath an edge 52b. This is true if light conditions are unsuitable for daylight exposures, and in this case, the diaphragm setting device for making flash exposures is ready for operation. If, however, there is sufficient daylight, the diaphragm setting device will be locked because of the fact that the ring 52 rotates, causing the pin 141a to engage a peripheral portion 52f. This keeps the lever 141 in its starting position as shown in the drawing, which corresponds to the largest diaphragm aperture.

The camera includes a built-in flash device one element of which is a lamp socket 143 shaped like a pair of tongs and adapted to receive a flash bulb 144. The socket is connected by a resistor 145 to one terminal of a battery 146. A leaf spring 147, one end of which is attached to an insulator 148, connects the other terminal 144a of the flash bulb to a condenser 149 which, in turn, is connected to the other terminal of the battery 146 to complete a circuit by which the condenser is charged. The discharging, or ignition, circuit may be considered as beginning at a junction 150 and proceeding through a winding 151 of an electromagnet 152 to a conventional synchro switch, which comprises two contact springs 153 and 154 attached to an insulator 155, and from there through a second switch, which consists of springs 156 and 157 attached to an insulator 158, and from there back to a junction 159 which is located between the battery 146 and the condenser 149. From the junction 159 the ignition circuit includes the condenser 149, the leaf spring 147, the flash bulb 144, and the socket 143, which completes the loop back to the junction 150. The synchro switch is actuated by a second arm 15b that is bent off from the ring 15 so that the closing of this switch coincides with the full open position of the shutter. The second switch, on the other hand, is actuated by a cam 52d on the ring 52 which engages an insulating follower member 156a attached to the spring 156. The cam 52d is arranged in such a manner that the latter switch is closed as long as the sensing slide 47 and, hence, the adjusting ring 52 occupy their inoperative positions as shown in the drawing.

The invention also includes means for automatically ejecting the burnt-out flash bulb, which means cooperate with the diaphragm setting device for flash exposures as well as with the locking device 97 of the release lever 24 in such a manner that the release pushrod 28 can be actuated only when the diaphragm has been set correctly and when the flash bulb is in the socket. The ejector, itself, is the leaf spring 147 which has a tendency to straighten out and thereby to push the flash bulb 144 out of the socket 143. However, the spring is prevented from doing so by a holding pawl 160 which is rotatable about a fixed pin 161 and which is urged into locking engagement with the strip 147 by a coil spring 162 wound about the pin 161 and compressed between the pawl 160 and a fixed pin 163. On the side of the pawl 160 opposite the leaf spring 147 the electromagnet 152 is arranged so that, when its winding is energized, the pawl 160 will be attached and will pivot clockwise against the force of the spring 162. This releases the leaf spring 147 to push the flash bulb 144 out of the socket 143.

The released position of the spring 147 is communicated to the pin 101 of the arresting lever 97 by a pin 164 which is longitudinally displaceably positioned in a guide (not shown in the drawing) and by a pair of levers 165 and 166. These levers are pivotally mounted on a bearing pin 167 and the lever 165 has a pin 168 while the lever 166 has a bent off arm 166a that extends into the range of motion of the lever 165. One end of a coil spring 169, which is wound around the pin 167, bears against the arm 166a while the other end of the spring presses upon the pin 168, causing the lever 165 to engage the arm 166a so that the two levers may be considered to be tensionally connected together. Another coil spring 170 tends to pivot the two levers 165 and 166 counterclockwise by virtue of the fact that one end of the spring 170 bears against a fixed pin 171 while the other end presses upon the pin 168. In this way the free end of the lever 165 is tensionally connected to the leaf spring 147 by means of the pin 164. The free end of the lever 166, on the other hand, is located in the path of motion of the pin 101 on the arresting lever 97 and presses the latter pin downwardly, causing the arresting lever 97 to be pivoted counterclockwise and the release lever to be released except in circumstances to be described hereinafter. When the bulb is ejected, the pair of levers 165 and 166 is able to rotate a certain amount counterclockwise under the pressure of the spring 170 while the pin 164 is being displaced, whereby the arresting lever is released to return to its operative position.

The lever 166 cooperates with the scale beam lever 136 to lock the release member when the values set on the range scale 114 and on the guide number scale 111 mathematically produce a value which is outside the diaphragm setting range of the camera. For example, if, as is shown in the drawing, the range is set at "6 m." and the guide number is set at "12," the known equation, which is:

$$\frac{\text{guide number}}{\text{range}}$$

equal diaphragm, produces the diaphragm value "2." However, it happens that in the particular shutter depicted the largest diaphragm value to be obtained is only "2.8." At the other extreme, the guide number setting "25" and the range setting "1 m." mathematically produce the diaphragm value "25," while the minimum aperture size of the diaphragm of this particular shutter is "22." Associated with the two extreme settings just mentioned by way of example is, respectively, a very large or a very small radial height of the cam 118a, which is accompanied by an extreme right or an extreme left position of the lever 131. Since the lever 131 is firmly connected to the scale beam lever 136 by way of the shaft 132, the pin 137 or the pin 138 presses against the lever 166 and pivots it counterclockwise against the action of the spring 169. This causes the lever 166 to be lifted off the pin 101 so that the arresting lever 97 is able to swing back into the locking position shown in the drawing due to the action of its spring 99. In this way, the release locking device remains operative in the two extreme cases, although a flash bulb is in the socket 143.

The foregoing arrangement by which the lever 166 cooperates with the arresting lever 97 is also concerned with the hook-shaped cam member 52e on the ring 52. If, because of very bright daylight which exceeds the operating range of the camera, the ring 52 is able to rotate clockwise to such an extent that the pin 101 again descends beyond the cam 52c, the release locking device is to be operative as described above. In those cases in which the lever 166 tends to keep the arresting lever 97 in its inoperative position, the foregoing requirement is fulfilled by having the hook-shaped cam member 52e engage the pin 101 and guide the arresting lever 97 to its operative position.

In addition to providing automatic setting of the exposure factors for either flash exposures or daylight exposures, the invention also provides for the possibility of disconnecting the automatic setting devices to permit manual setting of exposure time and diaphragm aperture. For this purpose there is a manual diaphragm control 172 which can be set with respect to a fixed mark 173 at an "AUTO" setting position as well as at a range of positions identified in a scale 174 corresponding to different aperture sizes. If the word "AUTO" is brought opposite the mark 173, the automatically operated setting devices for flash exposures and daylight exposures becomes operative, but these automatic setting devices remain inoperative if the control 172 is set at some position in the range defined by the diaphragm aperture scale 174. In the latter case the setting of the escapement mechanism 30–34 as well as of the diaphragm lamellae 2 can be effected manually.

A control slot, or cam, 172a is provided on the ring 172 for the purpose of setting the diaphragm, and a pin 175 engages this slot. The pin 175, in turn, is affixed to a bell crank lever 176 which is pivotally mounted on a pin 177 and which has a free arm that engages the pin 12 of the ring 4.

Before discussing the exposure time setting, it is important to describe the operation of the photocell 37 and the way in which it is short-circuited when the ring 172 is set at one of the positions within the scale 174. Two contact springs 183 and 184 are provided for short-circuiting the photocell 37 and these springs are attached to and spaced apart by an insulator 182. The springs are connected, by means of wires 183a and 184a to the photocell 37 and to the rotating coil 36 so that when the springs 183 and 184 make contact, they short-circuit the photocell and thereby prevent any current from flowing in the rotating coil 36. The closing of the contact springs 183 and 184 is effected by means of a lever 185 which is pivotally mounted on a pin 187 and is urged in the clockwise direction, which is the direction for closing the contact springs 183 and 184, by means of a spring 186. The lever 185 has a pin 188, and one end of the spring 186 engages this pin while the other end of the spring is hooked on to a fixed pin 189. Pin 188 extends into a cam slot 172c of the diaphragm control 172 so that the contact springs 183 and 184 are open when the control 172 is in its "AUTO" setting position, while these springs are closed when the control 172 is at any point of its setting range defined by the scale 174. When the springs 183 and 184 are connected together, there can be no current flowing in the coil 36, and as a result, the exposure meter pointer 46 occupies its most leftward position, in which it arrests the sensing member 47 in the inoperative position of the sensing member by means of the arresting slide 102.

When the contact lever 185 is pivoted clockwise, an extended end of the spring 186, which projects into the range of motion of the sensing pin 60 of the load transmission lever 58, is pivoted to such extent that this end of the spring 186 exerts a pressure on the sensing pin 60 opposing the pressure of the spring 63. Because of the action of the spring 186, the load transmission lever 58 and the pair of levers 62 and 64 execute a counterclockwise rotary motion until the sensing pin 65 engages the cam 66a of the shutter speed control 66. Consequently, upon rotation of the shutter speed control 66, the sensing pin 65 causes the sensing lever 64 to follow the cam 66a so that the shutter speed, or exposure time, to be read on the exposure time scale 66c with reference to the mark 45 is set on the escapement mechanism by way of the levers 62 and 64.

As has already been mentioned, in the manual setting range, the exposure meter pointer 46 occupies its inoperative position because of the fact that the springs 183 and 184 are short-circuited together and thus short-circuit the photocell 37, whereby the arresting slide 102 locks the sensing member 47, which, in turn, locks the adjusting ring 52. This makes the cam 52c unable to disengage the release locking device formed by the lever 97. For this reason the diaphragm control 172 has an opening 172d into which the pin 101 projects. If the control 172 is moved out of its "AUTO" setting position and into one of the manually set positions on the diaphragm scale 174, the pin 101 is pushed out of the opening 172d by an obliquely ascending edge 172e. This causes the arresting lever 97 to swing into its inoperative position, thus eliminating the influence of the lever 166 on the arresting lever 97.

The above-described locking of the ring 52 in the manual setting range has still another effect. As has already been mentioned, in the case of daylight exposures with automatic exposure setting, the pin 141a of the T-shaped lever 141 engages the peripheral member 52f of the ring 52, causing the influence of the lever 141 on the diaphragm-lamellae ring 4 to be discontinued. However, when the ring 52 is locked, the pin 141a is able to move freely back and forth in front of the edge 52b. This means that the lever 141 will fix the diaphragm according to the setting of range and guide number on their respective controls. But the diaphragm is to be set manually by means of the control 172, and so the interference of the lever 141 is eliminated by means of a peripheral section 172f of the control 172. In the position "AUTO" the pin 141a will move freely in an opening 172b of the control 172.

The explanation of the mode of operation of the foregoing mechanism will be considered first from the point of view of the exposure setting device with differential effect for daylight exposures. In the embodiment shown the automatic setting process starts with the longest exposure time and the largest diaphragm aperture and proceeds in the direction of shorter exposure times and smaller diaphragm apertures when the control 172 is set at the "AUTO" setting position. In principle, there are three cases: (a) *Too little light,* in which case the preselected exposure time is too short; (b) *Sufficient light,* in which case the preselected exposure time is at least adequate and is not too long; (c) *Too much light,* in which case the preselected exposure time is too long and a shorter exposure time is actually set by the escapement mechanism.

*Case A.—Too little light*

This condition results from a mistake by the photographer in setting the shutter speed control 66 to a speed value on the scale 66c that does not permit the shutter blades 13 to be open long enough to make a satisfactory exposure even if the diaphragm lamellae 2 remain in their most open position. When the shutter release 28 is depressed under such circumstances, the position of the exposure meter needle 46, as governed by the current produced in the photocell 37 and by the position of the arm 40 under control of the pin 42 and the cam 43a, will be such that the needle will be relatively far to the left in its range of positions and thus the sensing member 47 will be able to move downwardly only a very short distance before one of the steps on the stepped cam 47a strikes the exposure meter needle. As a result of this small movement of the sensing member 47, the setting ring 52 will likewise be moved through only a small angle.

Because the ring 56 is prevented from moving by the brake 57, the pinion 54 begins to roll on the internal teeth 56a, thereby driving the ring 55 clockwise. This causes the cam 55b to move the pin 60 and thereby to pivot the pin 59 and the forked lever 62, together with the sensing lever 64, in the counterclockwise direction. As a result, the sensing pin 65, which initially occupies a position close to the outer arcuate edge of the shutter speed control 66, moves toward the step on the cam 66a that happens to be opposite the pin 65, but does not reach this step before the rotary motion of the ring 55, and hence the movement of the pin 65, is terminated. This causes the forked lever 62 to stop in a position which does not correspond to the previously set exposure time, but instead to a longer exposure time. As a consequence, the escapement means which operates the shutter blades 13 and which are controlled directly by the position of lever 62 and only indirectly by the shutter speed control 66 will cause the shutter blades 13 to remain open for a longer time than is indicated on the scale 66c.

The diaphragm setting mechanism remains in its initial position with the diaphragm lamellae at positions corresponding to the largest aperture. This happens because the rotary motion of the ring 55 stops before the pin 65 strikes the cam 66a. As is normally the case, the continued movement of the shutter release trigger 28 strikes the release lever 24 which, in turn, drives the arresting lever 22 and releases the disc 17 so that it is able to run down and to operate the shutter blades 13.

What has happened is that the mechanism has automatically caused the exposure to be made with the largest diaphragm opening and at a shutter speed longer than expected by the photographer, but suitable to make a satisfactory exposure of the film.

*Case B.—Sufficient light*

This case corresponds to a rather wide range of shutter speed settings which cause the shutter to be open for at least a time long enough to make an exposure when the diaphragm is set at its largest aperture value, but not so long as to over-expose the film when the diaphragm is moved by the automatic mechanism to its smallest aperture setting. As in all cases, the exposure begins with depression of the shutter release 28. The needle 46 may be at any of its positions and the sensing member 47 will move downwardly until one of the steps of the stepped cam 47a strikes the needle. In so doing, the ring 52 will be turned, thus causing the pinion 54 to be rotated by the internal teeth 56a and to rotate the ring 55. This, in turn, rotates the pin 59 until the sensing pin 65 strikes the particular step of cam 66a that happens to have been placed opposite the pin 65 by the setting of the shutter speed scale 66c with reference to the mark 45. At the same time, the levers 62 and 64 both move counterclockwise.

If the sensing member continues to move downwardly after the pin 65 makes contact with one of the steps of the cam 66a, the setting ring 52 and the pinion 54 continue to rotate. However, this rotary motion can no longer cause the shaft 59 to rotate. Instead, the spring 67 now comes into operation to inter-connect the two levers 62 and 64, while allowing relative rotary motion between them in one direction. The strength of the spring is chosen so that a greater force is required to overcome the pressure of the spring 67 by rotating the ring 55 than is required for overcoming the drag of the brake 57 on the ring 56. As a result, the pinion 54 no longer continues to be rotated by the internal gear teeth 56a but instead is rotated by the external gear teeth 55a, thereby driving the gear teeth 56a and thus turning the ring 56 clockwise. The preselected shutter speed thus remains set, while the additional motion of the sensing member 47 causes the automatic movement of the diaphragm lamellae 2 by way of the cam 56b acting on the cam follower pin 70 and pivoting the lever 68 so as to rotate the setting ring 4 to the proper position to set the diaphragm aperture size exposure factor to correspond with the preselected shutter speed and the available light.

*Case C.—Too much light*

This condition arises when the photographer sets the shutter speed at such a low value that an over-exposure of the film would be made even if the diaphragm were automatically set to its smallest aperture value.

Upon depression of the trigger 28 and movement of the sensing member 47 and corresponding movement of the ring 52, the pinion 54 the ring 55, and the pin 65 to the point at which further movement of the pin 65 is halted by coming in contact with one of the steps of the cam 66a and upon further movement of the sensing member 47 beyond the position in which the ring 56 has moved the diaphragm setting ring 4 to a position in which the lamellae 2 are closed to their smallest aperture value, the edge 56c of the ring 56 will finally strike the fixed pin 71 and will thereby prevent any further rotation of the ring 56. This again reverses the operation of the pinion 54, which, being unable any further to rotate the ring 56, must itself be rotated by the internal teeth 56a, thereby renewing the rotation of the ring 55. This causes the forked lever 62 to rotate in spite of the force of the spring 67, thus lifting the forked lever 62 away from the sensing lever 64 and moving the forked lever so as to pivot the lever 30 and to set the escapement mechanism to a value which will result in a shorter exposure than that for which the shutter speed control 66 was originally pre-set.

If the deflection of the needle 46 is still greater and if a high film sensitivity has been set by the control 43, the ring 52 may continue to rotate although the shortest possible exposure time has been reached. In such case the resulting photograph would be over-exposed, but this is prevented by the pin 101 of the arresting lever 97 which hooks beyond the cam 52c after the shortest possible exposure time has been reached, thereby locking the release lever 24. The hook-shaped cam member 52e will prevent the pin 101 from being moved out of this locked position, even if the lever 166 presses on the pin.

As has already been described, the T-shaped lever 141 is unable to move when the automatic daylight device is operational since its pin 141a rests on the peripheral section 52f of the ring 52. Nor is it possible to ignite the flash bulb 144 in this case even though the arm 15b of the shutter-blade ring 15 actuates the synchro switch 153 and 154 with each exposure. The failure to ignite the flash bulb is due to the fact that the switch 156 to 158 is connected in series with the synchro switch and is released by the cam 52d of the ring 52 so that it is open. If the ambient light intensity is so small that the exposure meter needle 46 locks the sensing member 47 by way of the arresting slide 102 and thereby locks the ring 52 in the operative position shown in the drawing, the cam 52d will remain on the insulating member 156a even when the shutter release 28 has been actuated, and as a result, the switch will be kept closed. Moreover, the pin 141a of the T-shaped lever 141 is able to engage the edge 52b of the ring 52. Thus the first pre-requisites for a flash exposure are fulfilled.

After the photographer has set the guide number of the flash bulb by reference to the scale 111 on the setting member 110 and has put a flash bulb in the socket 143 all that remains to be done is to set the range by means of the scale 114. The range must of course be set for each exposure. The positions of the cams 110a and 113a associated with the setting controls for guide number and range are sensed by the pins 122 and 128, respectively, and the cam 118 is set accordingly by way of the five-element jointed member 116 to 120. The sensing pin 130 mounted on the lever 131 follows the cam 118a so that the position of the pin 130 constitutes a measure for the diaphragm aperture to be set. The diaphragm setting process is initiated by the shutter release 28 which depresses the release lever 24. This motion is followed, in a clockwise direction, by the T-shaped lever 141 under the force of the spring 142. Rotation of the lever 141 causes the lever 139 to be rotated also along with the ring 4 which rotates in the opposite direction. The diaphragm setting is determined when the lever 139 impinges on the pin 130.

As the shutter release 28 proceeds further downward, the release lever 24 and the arresting lever 22 actuated thereby swing out sufficiently to permit the shutter drive mechanism to be released for running down. When the shutter blades 13 are fully opened, the arm 15d of the ring 15 presses on the contact spring 153 of the synchro switch thereby closing the ignition circuit and discharging the condenser 159 through the two switches 156 to 158 and 153 to 155, the winding 151 of the electromagnet 152, and the flash bulb 144. The current that burns the bulb simultaneously causes the electromagnet to attract the holding pawl 160, which frees the leaf spring 147 to permit it to eject the flash bulb from the socket 143.

As the flash bulb is ejected by the swinging action of the spring 147, the levers 165 and 166 execute a small counterclockwise rotary motion, during which the lever 166 releases the previously-depressed pin 101 of the arresting lever 97 to permit the latter to occupy its arresting position on the release lever 24, which continues until a new flash bulb has been put into the socket 143.

Instead of the guide number scale 111 cooperating with the fixed mark 112, abbreviations of the most current flash bulb types may be marked on the setting control 110. In this case the setting control 110 is to be connected to the film sensitivity setting control 43 by means of a notched coupling, and the mark for setting the flash bulb types is to be located on the film sensitivity setting control.

If exposures are to be carried out by means of manual settings, the automatic setting devices must be disconnected by rotating the diaphragm control 172 from its "AUTO" position into one of the manually controlled positions in the diaphragm scale 174. The release locking device is lifted against all other forces by means of the pin 101 which moves out of the opening 172d. The T-shaped lever 141 is no longer able to move since its pin 141a engages the peripheral member 172f. During the changeover the contact lever 185 executes a clockwise rotary motion and closes the short-circuit contact of the photocell 37. This forces the exposure meter needle 46 to be moved into its inoperative position and the ring 52 and the control rings 55 and 56 to be arrested in their starting positions. The diaphragm lamellae 2 may now be set only by the lever 176, the sensing pin 175 of which engages the slot 172a of the diaphragm control 172. Due to the pivoting of the contact lever 185, its spring presses on the pin 60 of the load transmission lever 58 so that the sensing lever 64 engages the exposure time cam 66a by means of its pin 65. The exposure time can thus also be set manually by rotating the control 66.

Instead of using a built-in flash device for flash bulbs that can be used only once, a similar device with an electronic flash may be built-in to the camera in accordance with the invention. The manually-operable readiness switch usually provided on such devices may then be connected to the lever 166 acting on the arresting lever 97 in such a manner that the lever 166 leaves the arresting lever 97 in its operative position as long as the readiness switch is switched off, while it pivots the arresting lever into its inoperative position when the readiness switch is switched on.

What is claimed is:

1. A photographic camera comprising a diaphragm having an optical axis; means for setting the aperture of said diaphragm automatically for taking flash photographs, said means comprising a five-element jointed structure comprising one fixed member and four movable connecting members located around said axis; a guide number setting control calibrated according to flashbulb guide numbers; a range setting control, one of said movable members being controlled by said guide number setting control and a second one of said movable members being controlled by said range setting control; a stop engaging a third one of said movable connecting members to be set thereby; a lever system connected to said stop to cooperate therewith and connected to said diaphragm, whereby the setting of said diaphragm for flash pictures is controlled by the position of said stop; and a spring resiliently biasing said lever system.

2. A photographic camera comprising a diaphragm having an optical axis; means for setting the aperture of said diaphragm automatically for taking flash photographs, said means comprising a five-element jointed structure comprising one fixed member, four movable connecting members located around said axis, two fixed joints, and two movable joints adjacent to said fixed joints, said movable joints comprising first and second sensing pins; a guide number setting control calibrated according to flashbulb guide numbers; a first cam connected to said control, said first sensing pin engaging said first cam; a range setting control; a second cam controlled by said range setting control, said second sensing pin engaging said second cam; a fifth articulated joint in said jointed structure connecting two of said movable connecting members; a cam on one of said last-named connecting members; a third sensing pin acting as a stop and engaging said last-named cam to be set thereby; a lever system connected to said stop to cooperate therewith and connected to said diaphragm, whereby the setting of said diaphragm for flash pictures is controlled by the position of said stop; and a spring resiliently biasing said lever system.

3. A photographic camera comprising a diaphragm having an optical axis; means for setting the aperture of said diaphragm automatically for taking flash photographs, said means comprising a five-element jointed structure comprising one fixed member, four movable connecting members located around said axis, two fixed joints, and two movable joints adjacent to said fixed joints, said movable joints comprising first and second sensing pins; a guide number setting control calibrated according to flashbulb guide numbers; a first cam connected to said control, said first sensing pin engaging said first cam; a range setting control; a second cam controlled by said range setting control, said second sensing pin engaging said second cam; a fifth articulated joint in said jointed structure connecting two of said movable connecting members; a cam on one of said last-named connecting members; a third sensing pin acting as a stop and engaging said last-named cam to be set thereby; a lever system connected to said stop to cooperate therewith and connected to said diaphragm, whereby the setting of said diaphragm for flash pictures is controlled by the position of said stop; a spring resiliently biasing said lever system; a shutter release mechanism engaging said lever system to permit said lever system to move only after said shutter release mechanism moves; an arresting lever for said shutter release mechanism; a pair of additional levers connected to said arresting lever and held thereto; and a flashbulb socket, said additional levers sensingly engaging said socket to render said arresting lever inoperative when said socket is filled.

4. A photographic camera according to claim 3 comprising, in addition, a resilient member adjacent to said socket; a pawl retaining said resilient member; a flashbulb ignition circuit; an electromagnet connected in said ignition circuit to be energized by ignition current and to retract said pawl to release said resilient member to eject burned out flash bulbs from said socket.

5. A photographic camera according to claim 3, comprising, in addition, a one-armed lever, said stop being mounted on said one-armed lever; a balance-beam lever; a common shaft for said one-armed lever and said balance-beam lever to rotate said two last-named levers together; a pair of pins on said balance-beam lever, said balance-beam lever engaging said pair of additional levers to provide a release locking device and to render said device operative as long as said stop and said one-armed lever are in end positions corresponding to a diaphragm value outside of the range permissible in said camera.

6. A photographic camera comprising a diaphragm having an optical axis; means for setting the aperture of said diaphragm automatically for taking flash photographs, said means comprising a five-element jointed structure comprising one fixed member, four movable connecting members located around said axis, two fixed joints, and two movable joints adjacent to said fixed joints, said movable joints comprising first and second sensing pins; a guide number setting control calibrated according to flash bulb guide numbers; a first cam connected to said control, said first sensing pin engaging said first cam; a range setting control; a second cam controlled by said range setting control, said second sensing pin engaging said second cam; a fifth articulated joint in said jointed structure connecting two of said movable connecting members; a cam on one of said last-named connecting members; a third sensing pin acting as a stop and engaging said last-named cam to be set thereby; a lever system connected to said stop to cooperate therewith and connected to said diaphragm, whereby the setting of said diaphragm for flash pictures is controlled by the position of said stop; a spring resiliently biasing said lever system; a shutter release mechanism engaging said lever system to permit said lever system to move only after said shutter release mechanism moves; an arresting lever for said shutter release mechanism; a pair of additional levers connected to said arresting lever and held thereto; a flashbulb socket, said additional levers sensingly engaging said socket to render said arresting lever inoperative when said socket is filled; a resilient member adjacent to said socket; a pawl retaining said resilient member; a flashbulb ignition circuit comprising a switch; an exposure meter comprising a sensing member; an adjusting ring engaging said sensing member to be operated thereby; a cam on said ring, said switch engaging said cam to be operated thereby to establish contact when said ring is in its inoperative position; and an arresting slide connected to said sensing member to ensure that said ring remains in its inoperative position when there is insufficient light for daylight exposures.

7. A photographic camera according to claim 6 in which said lever system comprises a T-shaped lever connected to said diaphragm; a pin on said T-shaped lever engaging a peripheral portion of said adjusting ring during automatic daylight exposures; a manual diaphragm aperture control ring, said pin on said T-shaped lever engaging said diaphragm aperture control ring for manually set exposures to lock said lever system.

References Cited by the Examiner
UNITED STATES PATENTS 3,065,683  11/1962  Gebele et al. _____ 95—10
3,162,111  12/1964  Koppen et al.

NORTON ANSHER, *Primary Examiner.*